United States Patent
Borrell et al.

(10) Patent No.: US 6,690,485 B1
(45) Date of Patent: Feb. 10, 2004

(54) PIXEL-DENSITY AUGMENTATION AND ADJUSTMENT WITH MINIMUM DATA, IN AN INCREMENTAL PRINTER

(75) Inventors: Ramón Borrell, Barcelona (ES); Hakan Fouren, Barcelona (ES); Emiliano Bartolomé, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/252,163

(22) Filed: Feb. 18, 1999

(51) Int. Cl.⁷ .............................. H04N 1/56; H04N 1/58
(52) U.S. Cl. .................. 358/1.9; 358/3.27; 358/502; 358/520
(58) Field of Search .............................. 358/1.9, 3.02, 358/3.1, 3.27, 502, 520, 521; 347/5, 14, 37, 43

(56) References Cited

U.S. PATENT DOCUMENTS

| | | | |
|---|---|---|---|
| 5,353,052 A | 10/1994 | Suzuki et al. | 347/19 |
| 5,489,926 A | 2/1996 | Arbeiter | 347/16 |
| 5,778,160 A * | 7/1998 | Smith | 358/1.9 |
| 6,270,187 B1 * | 8/2001 | Murcia et al. | 347/37 |

FOREIGN PATENT DOCUMENTS

| | | | |
|---|---|---|---|
| EP | 606 022 A1 * | 12/1993 | B41J/2/205 |
| EP | 0741041 | 6/1996 | B41J/2/205 |
| EP | 0881082 | 2/1998 | B41J/2/505 |

* cited by examiner

*Primary Examiner*—Scott Rogers
(74) *Attorney, Agent, or Firm*—Peter I. Lippman

(57) ABSTRACT

One invention form is a method using all input data for one or preferably plural colorants, one time to control colorant deposition in forming a pixel array on a printing medium, and at least one other time to control deposition of more of the same colorants. At least one "applying" includes choosing data-array pixels to deposit added colorant. The two data-usage times can be associated directly with depositing colorant in respective printer passes; or may be done at (or near) rendition, sending output data to printmasking for pass allocation. Selection preferably includes setting maximum density on the medium—and choosing locations for that density, best by analyzing data to find locally dense areas, e. g. counting neighboring pixels. Selecting also includes defining locations to receive particular density, and creating additional density levels based on densities in the data array. Another method form includes defining an augmentation array and applying it to control part of colorant deposition. Preferably also included is applying the original array to control other deposition of colorant. Applying the augmentation array preferably increases colorant deposition, relative to applying the original array, by less than 100% with non-linear response to data.

21 Claims, 12 Drawing Sheets

Fig. 1
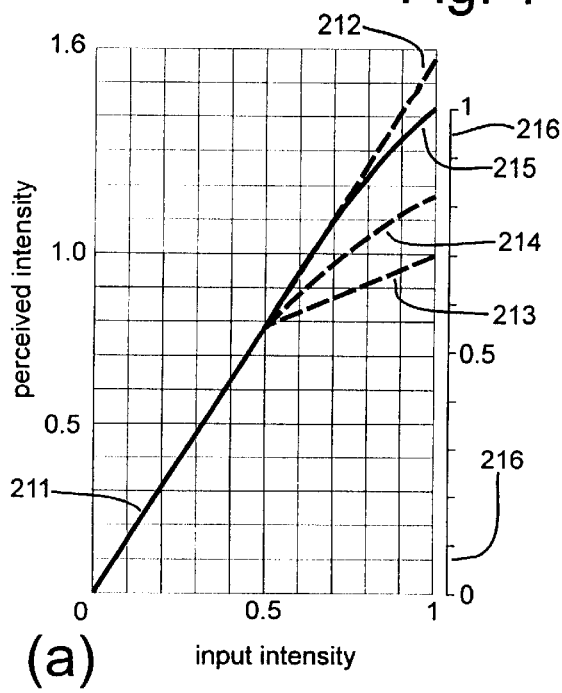
(a)
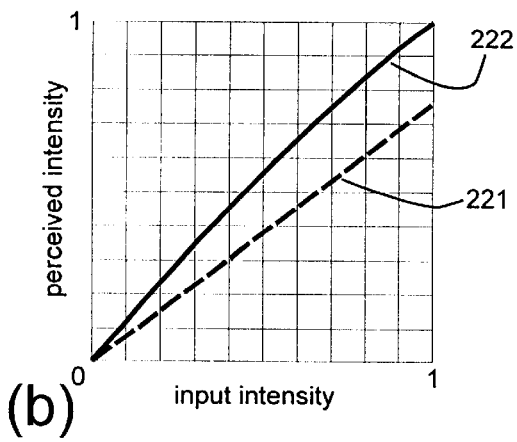
(b)
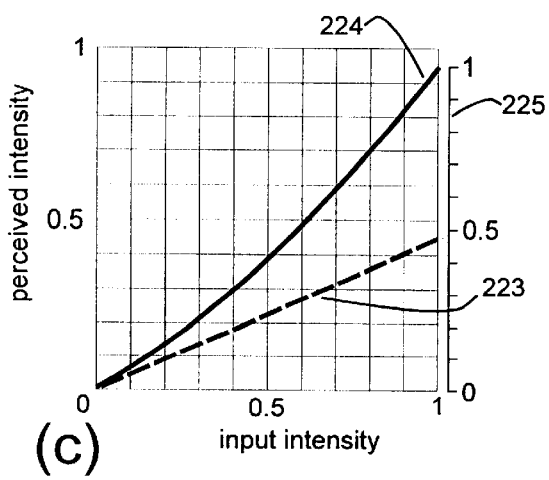
(c)

Fig. 2
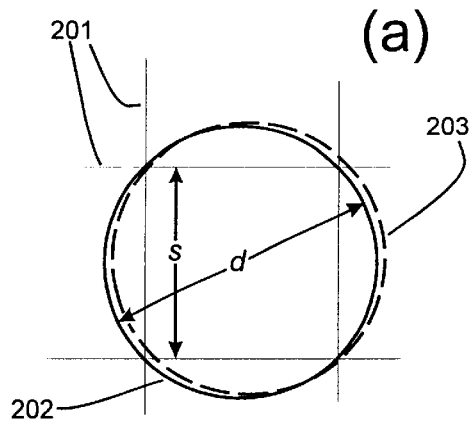
(a)
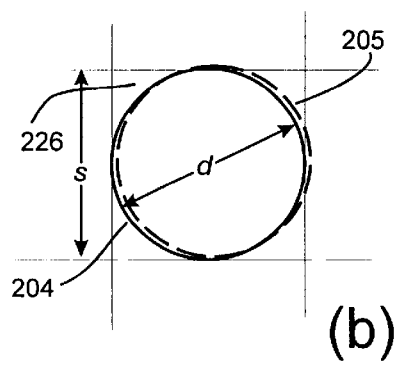
(b)
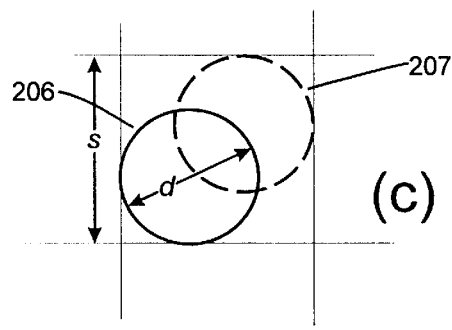
(c)
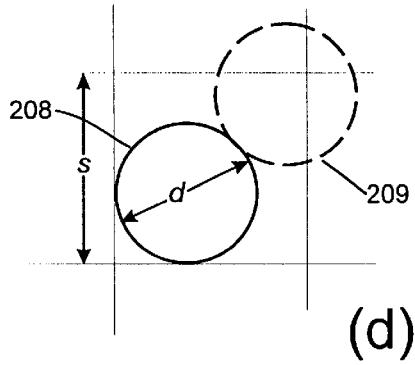
(d)

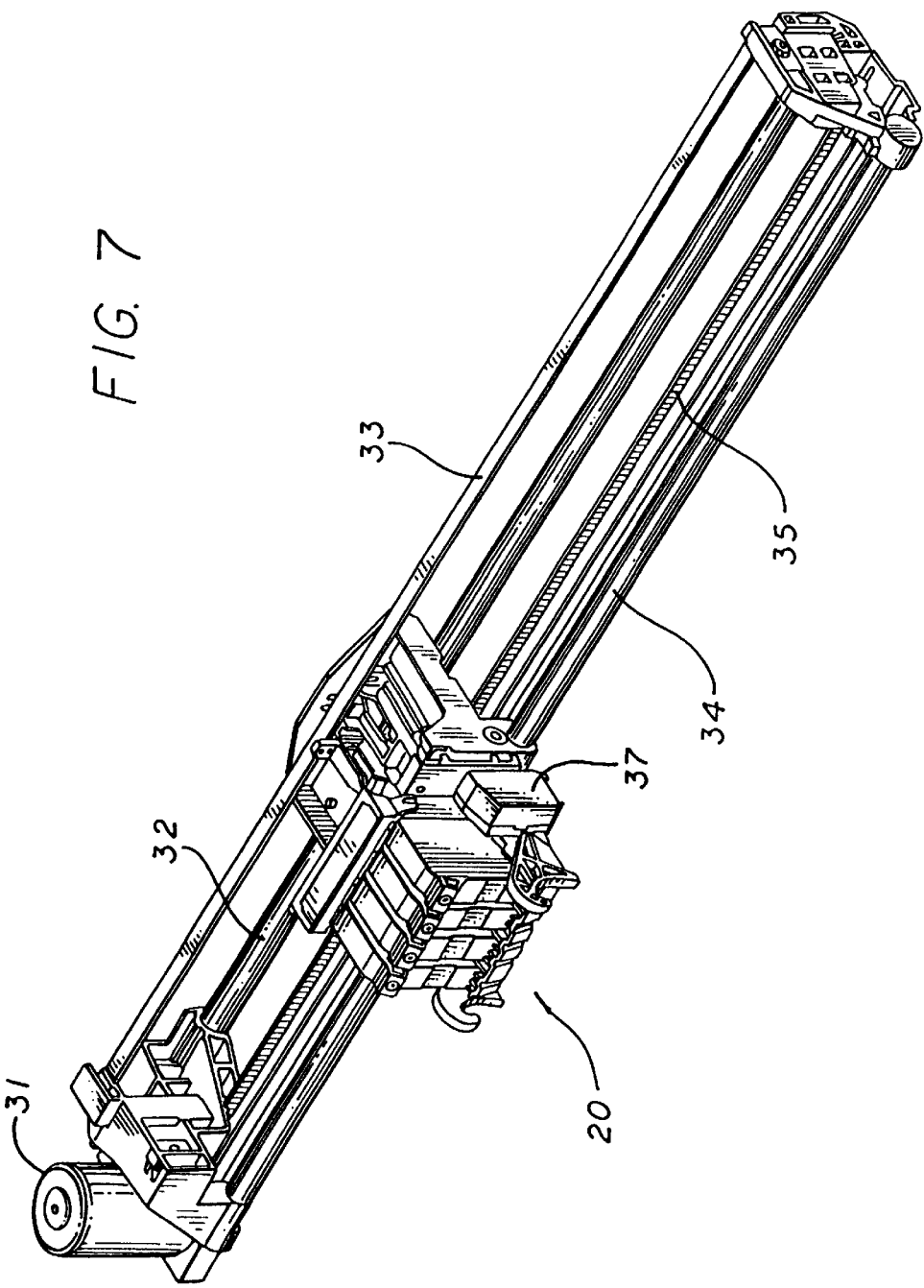

```
// Depletion logic wire  [255:0] depletion_candidates = DEPLETION_CONFIG[1] ?
                                         { 37{ CANDIDATE_ARRAY[6:0]}}:
                                         { 32{ CANDIDATE_ARRAY}};

wire  [255:0] depletion_hits =
                     (last_data >> 1) &
          curr_data & (curr_data >> 1) & (curr_data >> 2) &
                     ( new_data >> 1) &
                          depletion_candidates;

wire  [255:0] dot_data = DEPLETION_CONFIG[0] ? depletion_hits :
                                        ((curr_data >> 1) &
                                         ~depletion_hits);
```

Fig. 12

PIXEL-DENSITY AUGMENTATION AND ADJUSTMENT WITH MINIMUM DATA, IN AN INCREMENTAL PRINTER

RELATED PATENT DOCUMENTS

Related documents are coowned U.S. Pat. No. 5,821,957 of Berge et al., and U.S. Pat. No. 5,714,989 of Wade—and also U.S. patent application Ser. No. 09/041,408 in the names of Castle and Lund, issued as U.S. Pat. No. 6,109,723. Each of these documents in its entirety is incorporated by reference into this present document.

FIELD OF THE INVENTION

This invention relates generally to machines and procedures for printing text or graphics on printing media such as paper, transparency stock, or other glossy media; and more particularly to a scanning machine and method that construct text or images from individual colorant spots created on a printing medium, in a two-dimensional pixel array. Thermal-inkjet printers and processes are of greatest interest; however the invention is applicable in other types of units such as, for example only, piezodriven inkjet printers and hot-wax transfer printers.

BACKGROUND OF THE INVENTION (a) Mechanisms of color-intensity gradation—An incremental printer forms an image on a printing medium by placing colorant thereon in the form of tiny dots. An inkjet printer, for instance, ejects ink droplets that fly across a narrow gap to the print medium and so form the dots on the medium.

A principal way to reproduce color tones is by varying the areal density, i. e. number per unit area, of such dots on the medium. This variation ranges from none (white, if the print medium is white) to full density.

The phrase "full density" means that every location in the pixel array contains at least one dot. Making a color as intense as possible requires full density, to cover the printing medium with colorant.

Another way to produce various color tones is to vary the density of the colorant itself, i. e. the concentration of the colored substance that makes up each dot. This can be done for instance by applying plural quanta of colorant at a common pixel location.

Here the phrase "quanta of colorant" means the discrete units in which a printing system transmits colorant toward a printing medium. In inkjet and other liquid-ink systems, colorant quanta thus are drops of ink.

Variation in color tones can also be accomplished by storing colorants at various concentrations within the printing mechanism, and using those colorants in printing. This approach is relatively more costly and is not taken up further in this document.

(b) Texture and resolution vs. dynamic-range stability—The smaller the dots, the less visible are individual dots, thus producing an image that is less grainy and more realistic. These effects are desirable for ideal image quality at the low end of the dynamic range of color intensity—namely for very light colors such as highlight regions in photo-quality images, pastel washes and the like.

Certain factors, however, may cause the dots to be different in diameter than the nominal. Holding a nominal dot size is more difficult for smaller dots, and failure in this regard can introduce major problems, particularly at the opposite end of the dynamic range—in other words, in densely packed regions where color should be very intense.

Among the sources of divergence from nominal dot size are use of different media types, printing under differing environmental conditions, and variations in parameters of colorant quanta as defined earlier. Inkdrops for example vary in weight, volume, viscosity, cohesion, adhesion (including electronegativity and chemical affinities), pH, temperature, physical integrity (some drops break into pieces having various relationships), shape or shapes, dimensions, speed, and direction—as well as molecular weight, shape and dimensions—and all of these can affect resulting dot shape or size.

If dots are smaller than nominal, white spaces may appear in the areas where maximum color intensities should be, thus reducing such intensity through poor coverage. On the other hand, if dots are larger than nominal, the associated excess colorant leads to oversaturation of the printing medium with colorant or vehicle (particularly for colorant that is a liquid ink), which commonly creates undesirable image-quality defects.

Therefore dots cannot simply be made too small (or too large) so as to be on the safe side. It is important that dot size be controlled as well as practical or cost-effective.

Pursuing that objective, system designers often select the nominal dot size in such a way that variations about that nominal value minimize loss of image quality. Usually neighboring dots slightly overlap, to provide some allowance for error in case of slight misplacement or the chance of producing smaller dots than expected due to the variables that affect dot size.

In the end, dot-size selection is limited by the fact that positive variations produce oversaturation of colorant, again particularly for liquid ink. With that limitation, the native resolution of the system determines the dot size and in consequence the visibility of the individual dots—permitting only relatively little control over texture quality in highlight regions, as noted above.

(c) Nonlinearity—The foregoing discussion relates to the difficulties of obtaining nominal dot size and therefore stable dynamic range. Even with correct dot size, however, in single-bit incremental printing several factors make linear response 211, 212 (FIG. 1a) of color intensity very difficult to obtain.

From the FIG. 1a graph, some of these factors can be appreciated based on geometrical relationships between a pixel grid 201 (FIG. 2a) and a correctly sized dot 202. For tutorial purposes, two simplifying assumptions have been adopted in the graphs.

The first is that the distribution of dots in some analyzed uniform-intensity region of the image—i. e., for some moderately large portion of the pixel grid—at fifty-percent input intensity (0.5 on the abscissa) is a simple alternating-pixels checkerboard pattern. With such a dot distribution, if the dots are all correctly positioned there is no overlap of dots anywhere in the image region.

The second assumption is that, at all lower input intensities (zero through 0.5 on the abscissa), too, the dots are distributed with no overlap in the image region. As a result the perceptual response is simply the fraction of that image region which is covered with colorant.

The lower quadrant of the graph shows an idealized but nearly realizable response (i. e. perceived intensity) to an idealized progression of input-data intensities. The curve corresponds to placing drops of diameter d in a square pixel grid of pixel-size s (FIG. 2a), such that the diameter d just fits across the diagonal of the pixel.

Because the pixel square is exactly inscribed within the dot circle, d=s·√2, and the dots do not overlap along diagonals. If there are i such drops within a grid region of n squares, then the fractional area covered by the drops is:

$$\text{fractional coverage} = \frac{\pi r^2}{s^2} \cdot \left(\frac{i}{n}\right) = \frac{\pi}{4} \cdot \left(\frac{d}{s}\right)^2 \cdot \left(\frac{i}{n}\right) = k\left(\frac{i}{n}\right),$$

k being a constant. Thus the printer response is linear. Inserting the value $d^2=2s$, the coverage fraction becomes $$\frac{\pi}{4} \cdot (2) \cdot \left(\frac{i}{n}\right) = \frac{\pi i}{2n}.$$

This applies from i=0 (zero input intensity) up to the point where i=n/2 (fifty-percent input intensity). There the expression reduces to π/4≈0.785, thus establishing the rectilinear portion 211 of the curve.

If there were no sources of nonlinearity for higher values, the curve would continue along the dashed, angled straight line 212 to π/2≈1.57. In that upper half of the input-intensity range, however, a progressively greater fraction of the space in the image region is occupied by overlapping chordal areas of the circular dots.

The dashed straight line 212 represents a fictitious case in which the colorant deposited in an overlapping area has just as much coloring power as if it were printed in two separate nonoverlapping spaces. In actuality the first-deposited colorant in those overlapping areas is muted by the overprinted additional colorant, so that its effect is substantially lessened.

On the other hand, if it had no effect at all—in other words, if the incremental effect of overprinted additional colorant were zero—then the only impact of adding the second half of the input intensity would be to fill in the previously unprinted, pincushion-shaped blank spaces between dots. The area previously filled was 0.785 of a full 1.0 available area, so the response in this second fictitious case would move along the more-shallowly inclined straight line 213 to reach perceived intensity 1.0 at input intensity 1.0.

In reality the overprinted additional colorant has some positive effect, but as already stated the overall additive effect is muted so that the actual curve followed is between the two straight dashed lines 212, 213. Its slope tails off, very generally as suggested by the curved dashed line 214.

That dashed curve is not intended to represent actual performance quantitatively, but only to convey a general impression of the intensity response of such a system. In actuality the lower quadrant, too, of the response curve is idealized.

In practice, dithering and other characteristics of a system typically do not permit filling in dots in an absolutely systematic fashion leading to a checkerboard pattern at fifty percent. Therefore in a real case some overlapping occurs even in the first quadrant and typically leads to a rolling-off of the curve well before the fifty-percent point.

Furthermore, certain other influences exert influences on the response that are not at all purely geometrical—and unfortunately these greatly strengthen the tendency of the slope to tail off. In fact a pronounced "knee" shape develops in the response curve, leading to nearly a plateau near the full-input-intensity point.

One of these influences is dot-placement error (DPE). Such error increases the risk of having a knee, even with dot diameter equal to the pixel width or height (FIG. 2b). Where the relationship is as already discussed, and shown in FIG. 2a, the knee effect is pronounced.

The reason is that overlapping dot areas have less coloring power than the decoloring power of the relatively very large white spaces left unprinted when a dot is shifted out of position by, say, a half pixel width or more. The greater the DPE, the more noticeable the knee.

Finally, in liquid-ink systems there are strong colorant-to-printing-medium interactions that strongly affect the resulting diameter of the dots, depending on the dot density. Some media allow the dots to grow more when the medium is wet.

Drops first landing on the medium wet it, and drops landing thereafter grow more than they would if they were landing on dry medium. That dot-growth effect favors the creation of the knee, since the effective diameter of dots in high-density areas is larger than the diameter of dots measured in low-density areas exhibiting less interaction.

In addition to dot growth, other colorant-to-medium interactions include variation of the penetration depth of the colorants into the medium. This is a function of the moisture content of the medium, and consequently is influenced by the dot density.

The higher the dot density, the more wetting, the more penetration, the less colorant on the surface, and the less light absorbed—high liquid saturation leads to low chromatic saturation. These phenomena too generate strong knee effects.

As a result the actual response is only slightly above the dashed straight, but angled, line 214. Also the rolloff into the knee region—over a transition region from the straighter lower-quadrant behavior—is more gradual than might be suggested by the sharp angle graphed at the fifty-percent point.

These variations all add up to an unsatisfactory chromatic-saturation performance in which the upper half of the response is strongly collapsed or depressed, so that it is disproportionate to the lower half. Fully saturated input colors do not look less saturated, as printed, than half-saturated colors—but they do not appear much more saturated, either.

Relatively subtle, developing colors, that should be trending toward a strongly saturated portion of an image, for example, may show great promise of things to come. The promise is there, but the punch is gone.

Another kind of disappointment is graphed by the straight dashed line 221 (FIG. 1b), representing performance related to the geometry between a pixel grid and a relatively smaller dot 204 (FIG. 2b) that just fills its pixel horizontally and vertically, rather than along a diagonal. Thus the drop diameter in this case is d=s. Here the same simplifying assumptions have been adopted as described above—particularly use of a simple checkerboard pattern at fifty-percent fill, and systematic non-overlap of dots below that point.

(Although a common pixel size is drawn in all four views in FIG. 2—with different apparent dot sizes 202, 204, 206—the drawing is intended to show only relative sizes of the dots, as compared with the sizes of the associated pixels. Thus the dots 202, 203 in FIG. 2a are not necessarily large dots in an absolute sense; they and their unit pixel 201 could both be either very small or very large. Likewise those dots 202, 203 could be smaller than the dots 204–209 in the lower views, or all three could be the same absolute size.)

Now in FIG. 1b it is the entire graph, not only the lower-left quadrant, that shows an idealized but nearly realizable response. Because the pixel square is exactly circumscribed outside the dot circle, the dots if correctly positioned do not overlap at all, anywhere in the image region.

If there are i such drops within a grid region of n squares, then the fractional area covered by the drops is:

$$\text{fractional coverage} = \frac{\pi r^2}{s^2} \cdot \left(\frac{i}{n}\right) = \frac{\pi}{4} \cdot \left(\frac{d}{s}\right)^2 \cdot \left(\frac{i}{n}\right) = k\left(\frac{i}{n}\right),$$

as before, and the printer response again is linear. Inserting the value d=s, however, the coverage fraction for this case becomes $$\frac{\pi}{4} \cdot (1) \cdot \left(\frac{i}{n}\right) = \frac{\pi i}{4n}.$$

This applies from i=0 (zero input intensity) all the way to the full-intensity point, i=n (one-hundred-percent input intensity). There the expression reduces to $\pi/4 \approx 0.785$, the same value as found before but now at the 1.0 point on the abscissa rather than the 0.5 point.

The rectilinear idealized curve 221 spans the entire dynamic range of the printer. Here the problem—as seen based on geometry only—is not a knee but simply that the saturation is poor, and this plainly due to the large uncolored spaces in the corners 226 of all the pixels.

The poor saturation suggested in the graph is real. In actuality, however, even with a theoretical d=s situation, the DPE and colorant-to-medium effects explained above strongly favor the development of a knee in the curve, and again the more the DPE, the more noticeable the knee—though of course less pronounced than in the situation of FIG. 1*b*. Thus this case like the first is non-linear, and as a result also has poorer saturation than indicated by the graph.

Yet a third type of defeated expectation is symbolized by the straight dashed line 223 (FIG. 1*c*), representing performance for a dot shown in the solid line 206 or 208 (FIGS. 2*c*, 2*d*) that is smaller yet, in comparison with the pixel grid—so small that it fills only a fraction of its pixel. Such small dots are advantageous for printing on certain types of printing media.

The drop diameter in this case is d<s, and purely as an example roughly d=¾s. The same simplifying assumptions as for FIG. 1*b* are adopted here to show the response as rectilinear across the graph.

In a system with such extremely small relative dot size, there is little or no knee effect. The intensity response, however, is far from satisfactory: it is very inadequately saturated throughout the input intensity range.

The reason for this is the even larger uncolored space of FIGS. 2*c* and 2*d*. Such a system may be capable of excellent highlights, and may exhibit very little grain if the absolute size of the dots is low, but most users would object that it prints images badly washed-out.

(d) Single-bit systems—A system that is most economical minimizes the amount of data needed to encode the image at the time of printing. The minimum possible amount of data is one bit per colorant and per pixel, an advantageously modest data requirement.

The preceding subsection, however, discusses nonlinearity and deficient saturation in such systems. It demonstrates functional inadequacies which in general are a stiff price to pay for the associated data economy—and these are added to the problems of dynamic-range stability discussed earlier.

With this type of system, moreover, the only adjustment—per type of printing medium—possible heretofore is multiplication, by a fixed integral factor, of the number of dots per colorant and pixel location. This lack of flexibility is another major drawback.

For that adjustment, the limitations already discussed are applicable: dot size is fixed based on coverage and saturation for the colors of maximum intensity. Accordingly such an adjustment is very coarse, usually being limited to a selection between one dot or two, per colorant and pixel.

In purest principle perhaps a way to overcome these problems of linearity, saturation, dynamic range and adjustability—in a single-bit system—might be to use extremely small dots and double up in more-intense pixels. Some such schemes may be seen in FIGS. 2*c* and 2*d*, from which it can be appreciated that even with these arrangements a significant unpainted space remains in each pixel.

What is more, specifying all the additional dots needed to implement this strategy gives away the sole advantage of the single-bit system, namely the data economy. For these reasons and others, the approach does not appear to be a practical option.

As can now be recognized, the classical single-bit has great appeal. Nevertheless the system leaves much to be desired.

(e) Plural-bit encoding systems—Another, more sophisticated color-representation data management approach, known as color resolution enhancement technology ("C-Ret"), uses several data bits per colorant and pixel location. In C-Ret more than two levels of colorant can be specified and placed at each pixel. For example, four combinations can be specified from two bits: 00, 01, 10 and 11.

Each bit combination can be associated with a different number of colorant quanta, and the combinations need not be a direct binary representation of the number of quanta. For example "00" may represent no colorant, "01" and "10" may represent one quantum and two quanta respectively—but "11" may be used to represent four quanta or even five. The code, however, establishes explicitly what quantities of quanta are to be provided; and the code as such is implemented directly.

Thus C-Ret controls the number of colorant quanta placed in each pixel. In this system the size of an individual single-quantum isolated dot can be much smaller than the effective dot size of composite dots in high-density areas—i. e., dots made from several individual colorant quanta.

Such a system provides very small individual dots, less visible individually and so contributory to excellent print quality in highlights. At the same time it provides desired coverage and color intensity in regions of vivid color. This method allows for an adjustable maximum colorant amount by remapping, i. e. redefining, the number of colorant quanta (per location and per associated colorant type) that is respectively associated with each bit-value combination.

C-Ret is thus capable of introducing into the system a nonlinearity that can be made opposite in effect to the undesired knee effects described above, and so can be made to compensate for such undesired effects. Of course several passes (or slower scan speed) are needed to place several colorant quanta in a common pixel location. Such operation, particularly including distribution of colorant application as among plural passes, is discussed in a later part of this "BACKGROUND" section.

It is perhaps most natural to integrate C-Ret and other plural-bit systems into conventional printmasking regimes. The result is to parcel out the total number of colorant quanta into two or more passes in a conventional way.

(f) Bandwidth—In a single-bit system, as discussed above, the amount of data needed to encode the image at the time of printing is determined, by definition, as one bit per colorant and per pixel. This specification defines the system needs in terms of bandwidth for data processing, storage and transmission.

In the single-bit system, use of smaller dots heretofore requires more data to fully cover the printing medium when color of maximum intensity is required. This drawback is in addition to the problems of dynamic range introduced earlier.

The C-Ret system has substantially the same drawback. If two data bits are used, the number of data bits is simply doubled at the outset—as compared with a conventional single-bit system operating with larger dots.

If C-Ret is used with a greater number of bits, for even better dynamic-range adjustment or further nonlinear effects, then the data usage is expanded even more severely. The same is true of all other plural-bit systems.

Thus for printing with small dots, all conventional single-bit systems and plural-bit systems alike have a major drawback. To encode the image at the time of printing, at any given resolution, requires more data—and hence more bandwidth for data processing, storage and transmission.

(g) Depletion—It is known to selectively remove colorant quanta from portions of an image where excessive colorant would otherwise be deposited. Such intervention, known as depletion, is customarily employed as an essentially final adjustment after completion of all other image-processing steps including color corrections, gamut scaling or other gamut-matching efforts, dithering or error diffusion—but before printmasking and before machine-language control of the print engine.

Many patents have been issued on variations and refinements of the depletion function. The previously mentioned patent of Wade, for example, teaches a strategy of using inkdrop-volume measurements to fine-tune depletion. (Wade's interest is exclusively in managing the overall colorant deposition of an entire printhead; he makes no suggestion of selective control for any particular group of pixels in an image.)

Wade indicates that it is currently believed preferable to control overall colorant deposition through depletion algorithm techniques, and also that servoing colorant density by direct control of drop volume—by varying printhead temperature, in particular—runs a risk of adversely complicating the energy management of the head.

Depletion-algorithm techniques, on the other hand, avoid such risks and can accomplish the same results of controlling inking volume. Usually used to avoid depositing excessive colorant, such procedures edit out colorant spots from the pixel-array pattern to be created on the printing medium—but system designers try to implement this in an inconspicuous way that interferes as little as possible with the desired appearance of the image.

Depletion as universally practiced is thus a subtractive process, and not addressed to problems of color-intensity linearity. Castle and Lund, for example, in their above-noted patent describe using such a procedure to implement their determination of optimum print density in an inkjet printer. Their method includes analyzing nearby pixels in dense regions, to find candidate pixels for drop omission.

Their discussion makes clear that their concern is for gross liquid-overload problems as such—"smearing or blotting between pages" etc. They also mention in passing having "contemplated . . . an additive method that would apply additional drops of ink." Castle and Lund do not, however, suggest how such a method might be performed.

(h) Colorant addition—Colorant-additive procedures are known, but for entirely different purposes. The earlier-identified patent of Berge, for instance, teaches how to underprint a layer of chromatic colorant below a layer of black colorant. His goal is to avoid certain colorant-to-print-medium effects that cause generation of a color halo just inside the edge of a black field that directly abuts a chromatic-color field.

Berge explains that his method deters formation of the halo by chemically "preconditioning" the surface of the printing medium. Berge's presentation appears to suggest that the chromatic colorant is imbibed into the black colorant.

Perhaps his preconditioning exhausts an affinity of the medium (or of the black colorant) for the chromatic colorant. To carry out his scheme, Berge's system analyzes the profile of solid-black fields, and further tests their proximity to solid-chromatic-color fields, to select pixels for underprinting with the chromatic colorant.

Berge's patent does not suggest applying any such procedure to problems of colorant-density nonlinearity, or of deficient color intensities. His objective is very narrowly defined.

(i) Conclusion—Thus intensity shortfalls, and nonlinear colorant densities, have continued to impede achievement of uniformly excellent incremental printing—at high throughput—on all industrially important printing media. Important aspects of the technology used in the field of the invention accordingly remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits. Those facets are discussed in turn below.

In the process of implementing the present invention, a strong functional relationship to the depletion process has been discovered. The invention, however, has opposite objectives and opposite effect. Still, because of this kinship, which appears at the functional or operational level only, a coined nickname—"propletion"—has been applied to the invention.

In preferred embodiments of a first of its facets or aspects, the invention is a method of printing an image, by construction from individual marks formed in a pixel array on a printing medium, based on pixels of a corresponding input data array. This method includes the step of applying all data for a particular colorant, in the input data array, one time to control deposition of the particular colorant in forming the pixel array on the printing medium.

The method also includes the step of applying all data for the same particular colorant, in the data array, at least another time. This second application is to control deposition of an additional positive quantity of the same particular colorant in forming the pixel array on the printing medium. At least one of the applying steps includes the substep of selecting particular pixels of the data array to control deposition of the same particular colorant.

The foregoing may constitute a description or definition of the first facet of the invention in its broadest or most general form. Even in this general form, however, it can be seen that this aspect of the invention significantly mitigates the difficulties left unresolved in the art.

In particular, this novel method enables printing of a fuller dynamic range of colorant density—without paying the data-bandwidth penalties previously supposed unavoidable.

That is, the system can provide an extended density range with smaller data files to be stored, copied, and transmitted between different computers.

Although this aspect of the invention in its broad form thus represents a significant advance in the art, it is preferably practiced in conjunction with certain other features or characteristics that further enhance enjoyment of overall benefits.

For example, it is preferred, particularly if the method is for use in a scanning printer, that the "pixel-array forming one time" include depositing colorant in one pass of the scanning printer; and the "pixel-array forming another time" include depositing colorant in another, different pass of the scanning printer.

It is alternatively preferred, particularly for a scanning printer having a scanning printhead that makes plural passes across the printing medium, that the pixel-array forming one time and the pixel-array forming another time both direct colorant-deposition control data to a printmasking stage; and that the printmasking stage allocate colorant deposition in particular pixels among the plural passes. In this case, it is further preferred that the selecting substep include defining a maximum density for the pixel array of the printing medium.

Pursuing this same preference still further, it is preferable that the selecting substep include identifying locations of the particular pixels to receive said maximum density. In this case it is additionally preferred that the identifying include analyzing pixels of the data array to find locally dense areas. Further yet, it is desirable that this analyzing include counting neighboring pixels of at least some pixels in the data array.

Another preference as to the above-mentioned selecting substep is that it include defining locations of the particular pixels to receive a particular colorant density for said particular colorant. In this case, an added preference is that the selecting substep further include generation of additional density levels for printing based upon density levels within the data array; and that this generation include defining locations of specific pixels among the particular pixels, to receive at least one other specified colorant density for the same particular colorant. Yet another preference, along this line, is that the method also include performing both applying steps with respect to at least one other particular colorant.

In preferred embodiments of a second of its aspects, the invention is a method of printing an image, by construction from individual colorant marks deposited in a pixel array on a printing medium, based on pixels of a corresponding original data array. The method includes the step of, based on the original array, defining an augmentation array.

For purposes of this document, the term "augmentation array" means an array of selected pixels of the image that is to receive an additional positive quantity of colorant, beyond the quantity specified by the original data array. As the additional quantity is explicitly positive, this aspect of the present invention differs from depletion.

This additional quantity does not extend to the trivial case of a redundant, or entirely repeated, second printing of the same colorant distribution provided by the original array. In other words, "augmentation" is to be understood as adding colorant in positions that are selected, rather than merely making an entire image darker (as for example in the case of overprinting an entire page of text, as a way of producing boldface type).

Also included is the step of applying the augmentation array to control a portion of deposition of colorant in forming said pixel array on the printing medium.

The foregoing may constitute a description or definition of the second facet of the invention in its broadest or most general form. Even in this general form, however, it can be seen that this aspect of the invention too significantly mitigates the difficulties left unresolved in the art.

In particular, by forming and using an augmentation array that is selectively based entirely upon the original data, it is possible to enhance colorant density with no need for additional input data. A small price is paid in data processing to select pixels for inclusion in the augmentation array—but as will be seen from later portions of this document this processing burden is very minor.

Although the second aspect of the invention thus importantly advances the art, nevertheless it is advantageously practiced in conjunction with certain characteristics or features that enhance enjoyment of its benefits.

For example, it is desirable to also apply the original array to control another portion of deposition of colorant in forming the pixel array on the printing medium. The augmentation-array applying step increases the deposition of colorant, relative to the original-array applying step, by less than a one hundred percent increase. It will be noted that these first two stated preferences in essence reinforce the underlying concept of an "augmentation array" as set forth above.

Another preference is that the applying step use the augmentation array to provide a nonlinear colorant-deposition response to the data array. Preferably this nonlinear colorant-deposition response tends to compensate for a nonlinear response—of the image-construction process—to the data array.

Another preference, particularly for use with a printing mechanism that passes a printhead plural times over a printing medium, is that the applying step include using the augmentation array to control operation of at least one pass of the printhead. Alternatively it is preferred, particularly for use with a printing mechanism that has plural printheads for a particular ink color and dilution, that the applying step use the augmentation array to control operation of at least one printhead.

Yet another alternative preference—particularly for use with a printing mechanism that has plural sets of nozzles for a particular ink color and dilution—is that the applying step use the augmentation array to control operation of at least one set of nozzles.

From the foregoing it will be understood that one way to implement this aspect of the invention is by directing to a printmasking stage (1) the original input data array, together with (2) the results of applying the augmentation array to the input data array. The printmasking function then distributes among plural printing passes all the pixels that make up the sum total of both data sets—analogously to the printmasking done in conventional systems such as plural-pass single-bit systems, C-Ret systems etc.

This second facet of the invention is not limited to colorant augmentation in separate printing passes, but rather is also applicable to any method of controlling a portion of colorant deposition in forming the pixel array. Also possible, for instance, is selective increase of dot size for the pixels selected by the augmentation array.

In preferred embodiments of a third basic aspect or facet, the invention is apparatus for printing an image on a printing medium, by construction from individual marks formed in a pixel array on a printing medium, based on pixels of a corresponding data array. The apparatus includes some means for analyzing pixels of the data array to identify areas of the data array that are locally dense.

For purposes of breadth and generality in discussing the invention, these means will be called simply "the analyzing means". In addition the apparatus includes some means for applying the identified locally dense areas of the data array to enhance printing of the image on the printing medium by adding colorant. Again for generality and breadth these means will be called the "applying means".

The foregoing may represent a definition or description of the third major facet of the invention in its broadest or most general form. Even in this form, however, the contribution of this aspect of the invention to progress in the art can now be appreciated.

More specifically, this third aspect of the invention complements those discussed earlier. It selects pixels for use as the augmentation array of the second aspect, in performing the dual data application of the first aspect.

Nevertheless preferably this third facet of the invention is practiced in conjunction with certain additional features or characteristics that maximize enjoyment of its benefits. For example, preferably the analyzing means operate by counting inked data-array pixels adjacent to at least some of the data-array pixels, and the applying means apply additional colorant to identified locally dense areas.

Another preference is that the apparatus also include printhead devices for applying colorant, a carriage for moving those devices in a scan direction, printing-medium advance means providing relative motion between the carriage and medium at right angles to the scan direction, and an encoder system for developing carriage position and velocity signals; the analyzing means and applying means include a processor. In this case a further preference is that the analyzing means and the applying means each operate with respect to each available particular colorant.

This third facet of the invention, like the second, is applicable to any method of controlling a portion of colorant deposition in forming the pixel array. In other words this aspect of the invention is not limited to printing discrete colorant quanta in separate passes but rather—as described above for the second facet of the invention—can be implemented by dot-size increase if desired.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a group of three conceptual response-curve graphs, views (a) through (c), roughly showing deposited-colorant intensity of an incremental printer as a function of desired intensity indicated by input data—according to the prior art, and also as augmented through use of the present invention;

FIG. 2 is a group of four conceptual diagrams, views (a) through (d), showing alternative dot-placement geometries for use in accordance with preferred forms of the invention—FIG. 2a corresponding to FIG. 1a, FIG. 2b corresponding to FIG. 1b, and FIGS. 2c and 2d corresponding to FIG. 1c;

FIG. 7 is an isometric view, taken from front above left, of a carriage and carriage-drive mechanism which is mounted within the case or cover of the FIG. 6 device;

FIG. 12 is a Verilog Hardware Description Language (HDL) code snip implementing both depletion and propletion according to preferred embodiments of the invention.

DETAILED DESCRIPTION OF THE PREFERRED EMBODIMENTS

1. PROPLETION—PLURAL USAGE OF DATA TO ADD COLOR

Figure 3:
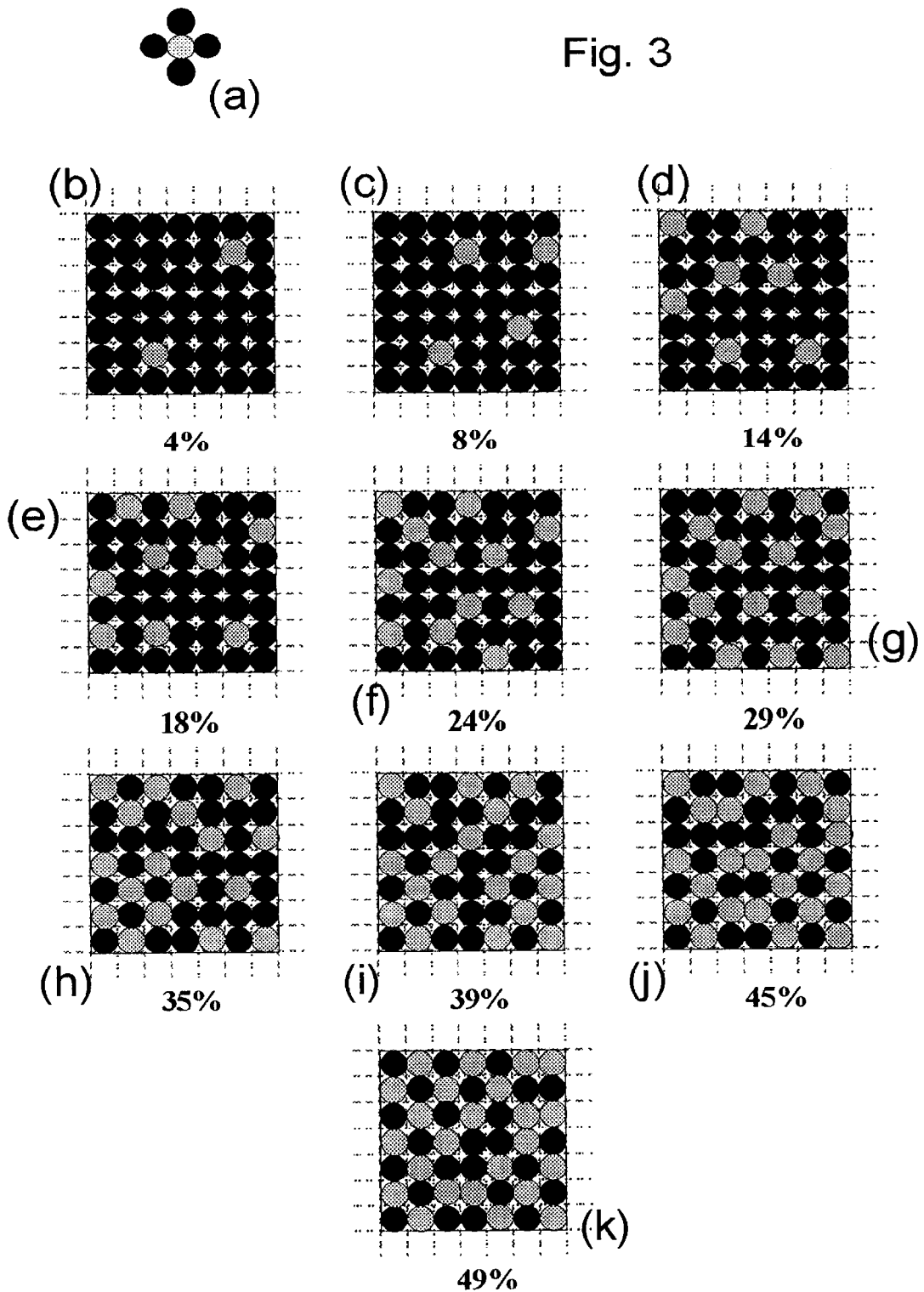
FIG. 3 is a diagram—according to preferred forms of the invention—of seven augmentation arrays for seven different density levels, showing pixel positions for which a dot is augmented if it is a candidate.

According to preferred embodiments of the invention, an image is rendered with one bit per pixel-colorant combination, but this bitmap is used plural times. As a result the system produces composite dots, of a common colorant, at selected pixels that are— plural dots 201, 203, or 204, 205 (FIG. 2) printed in substantially the same positions and thus more intense by virtue of additive, see-through effect of the double colorant dose; or plural adjacent dots 208, 209 which are more intense by virtue of the (1) larger subtended visual angle of the painted region, and (2) smaller remaining unpainted print-medium area; or plural offset dots 206, 207 or nested dots (not shown) forming composite dots that are larger and thus more intense—due partially to each of the two effects just mentioned.

The basic advantage of this invention is that intensity range can be stabilized and linearized without addition of data or bandwidth.

Added data-processing burden is negligible, because almost all the needed procedure is already in use anyway for depletion. In fact, as will be seen, in the programming code for a current implementation the process for dot selection actually is still worded—precisely as before—in terms of depletion.

There is a difference only in what the system later does with the selected-pixel information. It will also be seen that a significant additional amount of data processing occurs only for those dots that are identified as propletion candidates.

In combination with scatter-type dithers, propletion enables fine colorant-density adjustment and is very progressively applied. No additional memory is required for adjustable colorant density and low-graininess images.

Performance of the present invention is very close to C-Ret, but the system is simpler and less expensive. By virtue of the surrounding-pixels criterion embodied in the candidate array (FIG. 3a), this system refrains from augmentation at edges of lines, text and dense graphics. It thereby helps to preserve the sharpness of such features.

Moreover, in inkjet and other liquid-ink systems, propletion helps to avoid liquid saturation of the printing medium at high densities. The invention does so by selectively increasing the colorant-placement rate when demanding more intense colors—that is to say, by reserving high liquid loading for those particular situations in which high-intensity colors actually are needed for image quality.

There are at least two approaches to implementing this innovation. They are discrete pass control, and overall allocation.

These approaches, and related topics, are taken up in the immediately following subsections. After introduction of the augmentation arrays, in section 2 below—and discussion of linearity in section 3—an additional diagram-based discussion of these two approaches follows in section 4.

a. Discrete pass control—According to this approach, in one use the data are used to print the basic image, and in the other uses the same data are used to print additional colorant quanta on selected pixels.

As the additional quanta may be either overprinted or underprinted (in other words, either order is possible), this discussion will use the phrase "redundantly printed" colorant, or the term "augmentation" colorant, to encompass the "additional" colorant application whether it is first or not.

b. Overall allocation—Another quite practical possibility is that the colorant quanta to be printed are allocated among passes by a suitable procedure such as the printmasking function. In this case it is not really meaningful to speak of one pass producing the "basic" image and other passes producing "additional" colorant—the plural passes simply all add up to the total image, as augmented.

In general, known printmode tools can be applied in a great number of different ways to elaborate upon the fundamental methodology of propletion. Printmasks must be designed more carefully, however, because there are more colorant quanta and so more constraints.

Propletion in its simplest forms ordinarily requires at least two passes—some exceptions will become clear shortly—and overall flexibility is reduced if the number of passes is only two. Slightly offset small dots 207, 209 can be implemented through a fractional-pixel-row advance, in either direction, following one or two passes for printing the main image data.

Even in using the overall-allocation approach, nevertheless in most implementations it may be reasonable to speak of the "additional" colorant that is to be addressed to particular pixels of the image array. Ordinarily that colorant and those pixels can be identified in the data even after masking.

c. Submarine allocation—Still it remains possible, with suitable programming effort, to integrate the processing of the single data array in such a way as to avoid any identification of colorant as additional or basic—even apart from the question of colorant association with passes. Presumably the augmentation colorant in such cases is, in effect, camouflaged by e. g. randomized pass-to-pass variations in dot-to-pass assignments in a print-masking system.

Overall, such operation is detectable by counting within high-density regions a substantial additive dot surplus, beyond the randomized variations of the companion print-masking function—a kind of conservation-of-dots detection strategy. Alternatively, or as additional confirmation, the process of identifying pixels (or at least pixel neighborhoods) to receive augmentation colorant may be detectable in the algorithm itself.

There may be little practical reason to go to such lengths, but in any event even such processing is within the scope of the present invention. Preferred embodiments, for greater simplicity, select pixels to receive augmentation colorant in a discrete operation for that selection process, distinct from addressing pixels for the basic image. Selection preferably is done in this way, regardless of the timing of actual, physical application of colorant.

d. Prior-art allocation—Regarding the conventional technology called C-Ret, as noted earlier it appears natural to integrate such plural-bit systems into conventional printmasking. Alternatively it should be possible in some situations, at least in principle, to operate C-Ret and at least some other plural-bit systems in a direct bit-to-pass mode.

For example, colorant quanta developed as a result of C-Ret bits above binary "01" could be printed in respective separate passes. At the time of this writing, however, no such discrete-pass implementation of C-Ret is known to the present inventors.

e. Propletion by varying dot size or colorant concentration—As previously mentioned, preferred embodiments of some facets of the invention are not limited to colorant augmentation in separate printing passes, but rather are also amenable to implementation by any method of controlling a portion of colorant deposition in forming the pixel array. Such methods for instance include selective increase of dot size, for the particular pixels selected by the augmentation array.

As an example, notwithstanding the comments of Wade such an adjustment is readily performed in inkjet systems by control of drop volume or weight. This in turn can be achieved by increasing the firing energy or duration, etc. Suitable compensation in timing may be provided to compensate for associated changes in inkdrop speed. As Wade suggests, such a method does demand care in monitoring or otherwise accounting for the effect on nearby nozzles, and attending to the stabilization of the overall printhead temperature.

Nevertheless the techniques required for these procedures are all within the skill of the art. Those skilled in the art will recognize that the same techniques can be used to provide dots that are more highly concentrated though substantially unchanged in size.

2. EXTENDING RESPONSE LINEARITY BY PROPLETION

Through propletion the color-intensity dynamic range of a printer can be stabilized while also linearizing the response. In graphical terms this can be seen as pushing the severely rolled-off response 214 (FIG. 1) to a substantially higher and more nearly linear function 215.

For clarity of the illustration, that curve 215 has been drawn, arbitrarily, as adjusting the response to only about 90% of the full ideal response 212 mentioned earlier. In practice the response to full input intensity can be pegged to virtually any desired value, including a value that makes the response function very nearly linear over the entire input-intensity range.

Once fixed, at whatever such value has been selected by system designers, the output-response range of the system can be redefined—in effect establishing a new scale 216 that spans the available output values from zero perceived response up to the selected new maximum value. That scale is then mapped to the operating byte range of numerical values, most commonly zero through two hundred fifty-five, used by the system microprocessors.

As will be recalled, the curves of FIG. 1a correspond to the inscribed-pixel case of FIG. 2a. Generally analogous adjustments are shown to yield a response curve 222 for the circumscribed-pixel case of FIG. 2b, and here the curve has been shown drawn to the ideal maximum response—no remapping being required.

Similarly an adjustment for the overlap/offset-dot cases of FIGS. 2c and (d may lead to a correction curve 224 that approaches initial ideal full intensity, providing a very large intensity increase. As will shortly be seen, the now-preferred augmentation arrays provide a maximum propletion effect of 49%, and the curve in FIG. 1c has been drawn to illustrate—to an extent—this constraint.

That is, the augmented-response curve has been constrained to raise the maximum output intensity by no more than that 49% increment. Actually the constraint is by no means absolute, and augmentation arrays can be prepared to effect virtually any increment desired.

Since the augmentation colorant is subject to the same previously described rolloff effects as the colorants making up the basic image, the most-straightforward implementations generally produce a final response which itself has some tendency toward a knee. In other words, for modest investment in processing time, in hardware, and in algorithmic design typically a resulting curve still exhibits a convex-upward profile 215, 222.

Propletion, however, is a broadly general invention, having as its main thrust the splitting and reinterpretation of physical data states—to enable a longer and more-stable dynamic range, with versatile control of the response transfer function. Accordingly propletion is amenable to much more highly elaborated implementations.

One such refinement includes performing more than one augmentation usage of the original data. This variant may be practiced using the same augmentation arrays more than once, but with progressively more-stringent neighboring-pixel conditions (e. g., neighbors present to more than one pixel distance, or present along diagonals as well as rank and file—or both). Alternatively, or in addition, different augmentation arrays can be provided for the higher-level propletion usage.

Another implementation is a kind of melding of propletion with plural-bit systems such as C-Ret. In this case the data format used may be for instance, double-bit—but the application of these data through propletion can then readily emulate the effects of a data system having many more bits, e. g. four or seven.

The specific strategy just described has not been tested. What is significant is the broad point: a primary object of propletion is simply to make the most of the data that are stored, transmitted and processed. This relative concept should not be misinterpreted to mean that an absolute minimum of data must be used.

Through these refinements, for example, in principle an entirely new response contour can be engineered and created. Given enough degrees of freedom through use of these tools, but otherwise within the ordinary skill of the art, in theory such a contour can be fine-tooled to provide virtually perfect linearity (as for instance at 211–212) if desired. That form of response is highly prized in some applications, as for instance in reproductions of fine art, and in printing color charts for accurate technical reference.

The capability of propletion to correct for non-linearities is of course limited to systems that are indeed otherwise nonlinear—those, for instance, that show a knee. However, propletion can still be useful for initial profiles 221, 223 that might be called "knee-less".

For those systems, even at the cost of introducing a nonlinearity in a system that previously was basically linear, propletion allows small dots (desirable for low graininess and greater realism) to grow in the case of full area fill, and thereby approach full coverage—still without the cost of additional bits per pixel to encode the cases that require multiple drops per pixel and colorant.

As an example—whereas "punch" was earlier said to be lacking in the prior art—an accelerating or upward-concave propletion response contour 224 can be created to provide more punch than was ever present originally, in an image. This form of response too, somewhat overemphasizing vivid colors, is highly prized—but in other quarters, as for instance in advertising materials or in popular reproductions of vivid, cheerful-appearing photos and the like for ornamental display. Typically such benign distortions of original dynamic range are easier to obtain than strictly linear reproduction.

Figure 13:
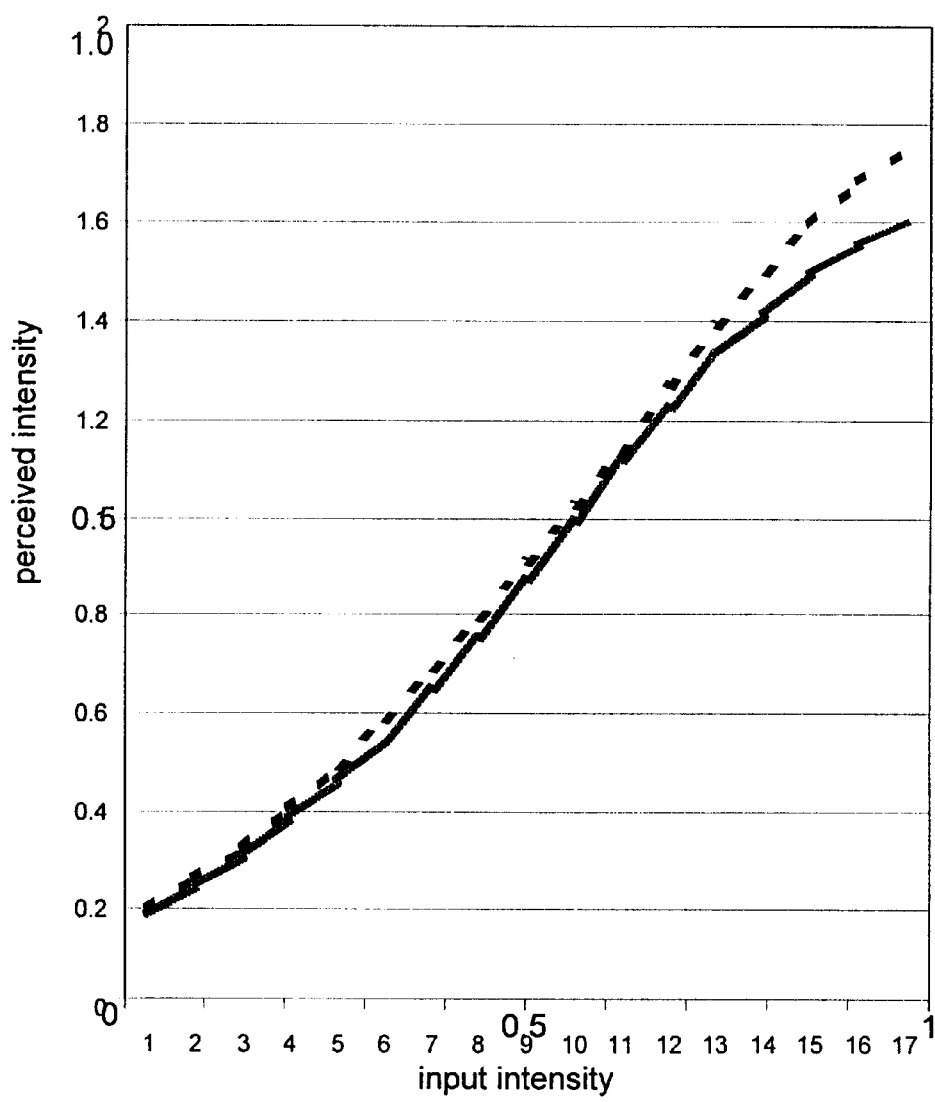
FIG. 13 is a graph of actual data showing assistance by propletion in extending and linearizing in a practical case of saturation in a blue ramp.

An example of actual results in a very modest practical case appears as FIG. 13. The data relate to linearization and extension of a partially saturated intensity ramp for blue. The solid curve represents the ramp without, and the dashed curve with, propletion.

3. CANDIDATE ARRAY AND AUGMENTATION ARRAYS

To select pixels for augmentation the invention preferably uses two criteria. First, candidates are selected based upon density of the surrounding area, or in other words local density.

Identification of dots that are in a locally dense area is accomplished by analyzing the neighbors of every pixel in the image. To do this the invention first overlays a so-called "candidate array" (FIG. 3a).

As the candidate array suggests, a dot is a candidate for propletion—or for depletion—only if its four row-and-column neighbors exist. In other words, pixels are considered to belong to a dense area if they meet the logical criteria defined in that small array—namely, being surrounded by pixels at least horizontally and vertically.

Second, for candidate dots only, a dot is augmented if its position matches that of a gray dot in a so-called "augmentation array" (FIGS. 3b through 3k) corresponding to a desired augmentation density. The system selects the desired density by choosing—either automatically or under manual control by a human operator—one of the ten available arrays.

The chosen augmentation array defines both the maximum density of augmentation colorant and the locations of individual augmentation-colorant quanta to be printed. To implement these definitions, the system tiles the chosen augmentation array over the image in the manner of a conventional dither mask.

There are two main differences between an augmentation array and a dither mask. The augmentation array is a simple binary mask, not a multiple-level threshold mask; and the augmentation array is used only in propletion, not in selecting pixels for printing the basic image.

Interestingly, based upon the augmentation-array selection process, propletion and depletion can coexist even in a single document—applied, for instance, to different colors. If a candidate pixel is in the augmentation array, that pixel is propleted; and if not, it is instead depleted. The two functions can even coexist for the same color.

Coexistence represents essentially a phase shift between data and final printed colorant. Such shifts may be appropriate because of environmental conditions such as humidity or temperature—interacting with the particular print medium in use—or due to geometry of features within the image.

Figure 4:
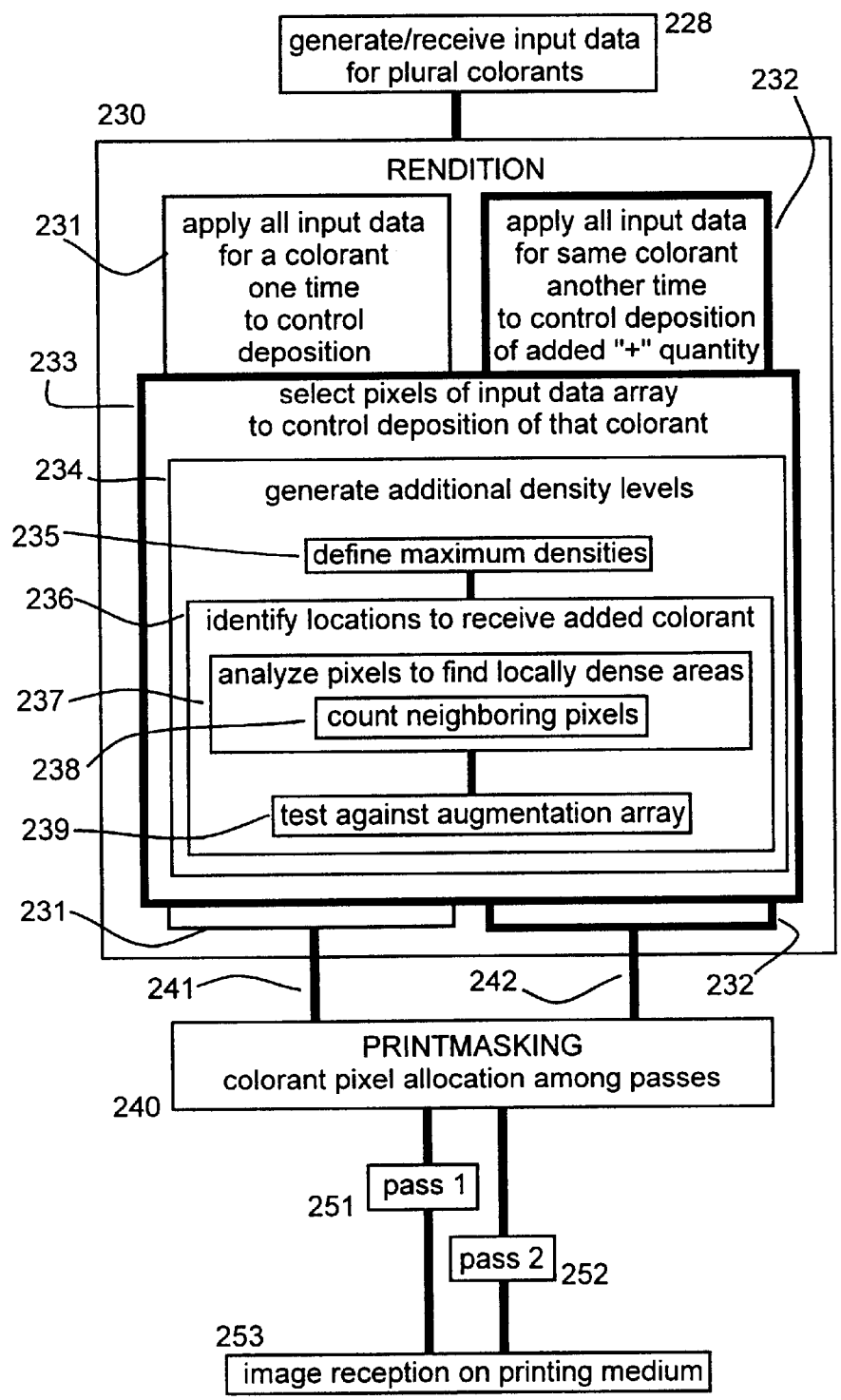
FIG. 4 is a flow chart showing method features of one preferred form of the invention.

4. METHODS a. Overall allocation through printmasking—Following establishment 228 (FIG. 4) of input data, propletion 233–238 may be taken up as part of the rendition process 230. The diagram suggests regarding propletion as part of rendition, because of the previously mentioned very close conceptual link to the classical dither-mask process.

If preferred, however, propletion processing can be performed in a separate procedure either before or after rendition. Moreover propletion can be used equally well with error diffusion instead of dithering.

Performance of either the dither or diffusion procedure is included as part of rendition, in the conventional manner. The dither/diffusion process and the main propletion process, in the diagram, are rendition subblocks 231 and 232—but either block may be propletion and the other may be the dither/diffusion process.

By parallel placement of the two subblocks 231, 232 it is intended to suggest that there is no temporal priority as between the two functions—they are fundamentally independent and can be performed in either order or even simultaneously. Simultaneous performance is possible using a single processor with time-interleaved functions, as for instance in the now-familiar multitasking mode, or with one or more coprocessors.

It is perhaps natural to think of pixel selection 233, the main propletion process in this printmasking form of the invention, as associated with the block 232 that contains the phrase "another time". In the diagram, however, pixel selection 233 is shown as straddling both rendition subblocks 231, 232.

The point of this placement is to emphasize once again that application of input data at either "one time" or "another time" may be the propletion processing. Moreover, as noted earlier a system may have more than one propletion stage, corresponding to performance of the propletion part of the processing more than once.

Within the pixel-selection process conceptually a primary function is generation 234 of additional density levels. This conceptual function most preferably includes two main practical steps as outlined earlier in subsection 1*b*, namely the definition 235 of maximum densities and identification 236 of locations to receive the augmentation colorant.

The definition step 235 is preferably performed by selection of one of the augmentation arrays (FIGS. 3*b*–3*k*). For perhaps optimum artistic fine control, an operator may do this manually by e. g. entering a selection into a computer application—for instance a printer driver or a stand-alone graphics/photopaint program.

Alternatively the operator who is not able or interested may opt out of that choice, simply designating (or allowing by default) the application program itself to perform the array selection. The system responds by doing so based upon usual preferences for ordinary or average image characteristics—or may be programmed to analyze aesthetic characteristics of the image to determine which augmentation array is most suitable.

The identification step 236 includes analysis 237 of the data array to find locally dense areas and so pick out pixels that are candidates—for either propletion or depletion, as mentioned earlier. This step entails a counting 238 of pixels, using the candidate array (FIG. 3*a*).

Next the identification 236 concludes with application 239 of the selected augmentation array to the candidates. If they are pixels shown in gray in the accompanying graphical representation of the augmentation array—as tiled over the image—then they are passed at 241 or 242 to the printmasking function 240; and if not, they are subjected to depletion (not shown).

Figure 5:
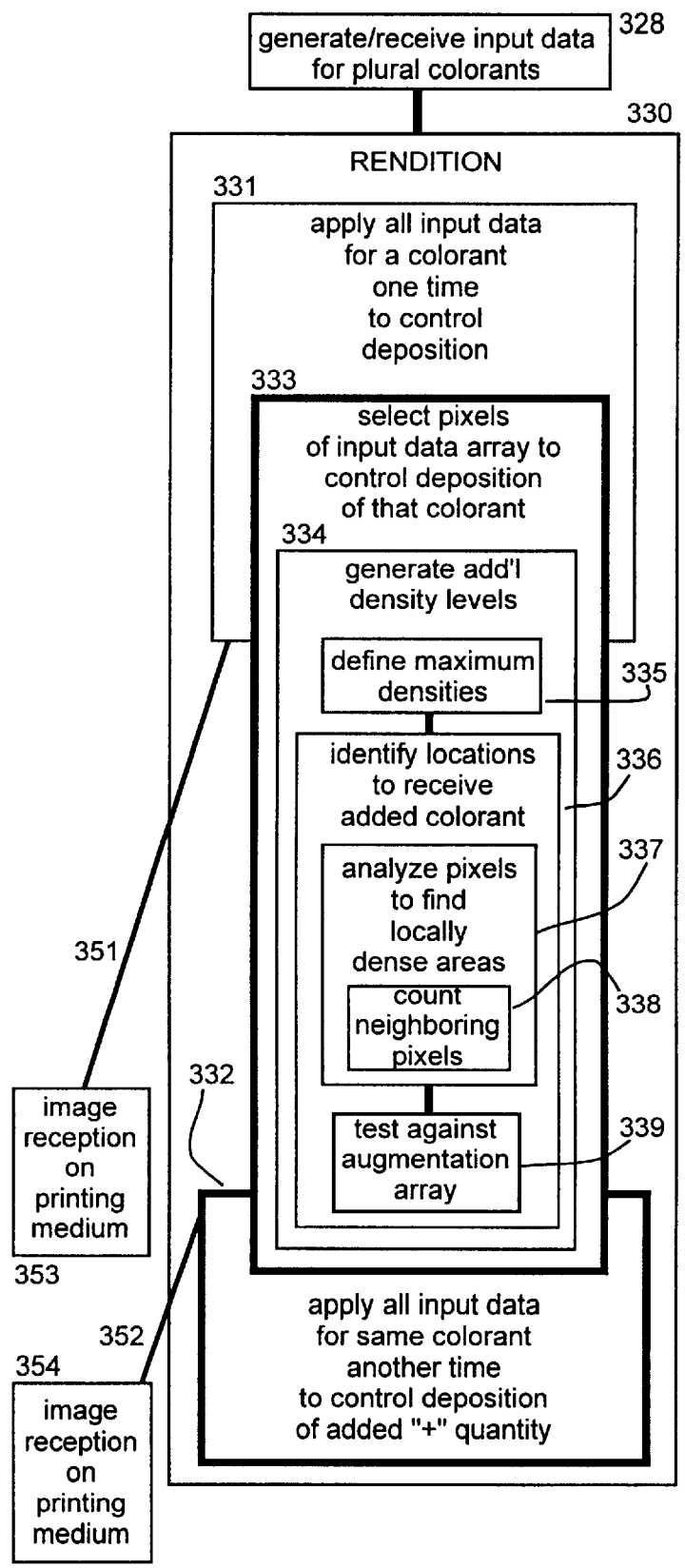
FIG. 5 is a like view but for another preferred form.

The printmask function 240 allocates among two or more printing passes all the dots to be printed, and those passes 251, 252 are then performed sequentially. Each printing pass contributes to reception 253 of the image on the printing medium.

b. Discrete pass control—This simpler procedure dispenses with printmasking as a separate function, and simply applies the input data to control deposition directly. As this is most preferably done in real time to minimize the need for temporary storage, the two application steps 331, 332 (FIG. 5) are preferably performed in sequence as shown.

Again, however, either the first or second step 331, 332 may be the propletion-processing step, and the remaining one of the two is then the conventional portion of the rendition. For this reason, in the diagram the principal propletion block 333 is drawn overlapping both of the main rendition steps 331, 332 and thus may be a portion of either.

Again, propletion processing may if desired actually be performed more than once—ordinarily at different augmentation density levels. Also some augmentation pixels may be selected in each of the two main rendition steps 331, 332 here (and in the printmasking variant as well).

Details 334–339 of pixel selection 333 are substantially as described above for details 234–239 (FIG. 4). Similarly the printing passes 351, 352 here are performed straightforwardly, as were their analogs 251, 252 in the printmasking case.

5. BASIC HARDWARE FOR IMPLEMENTATION OF THE INVENTION

Figure 6:
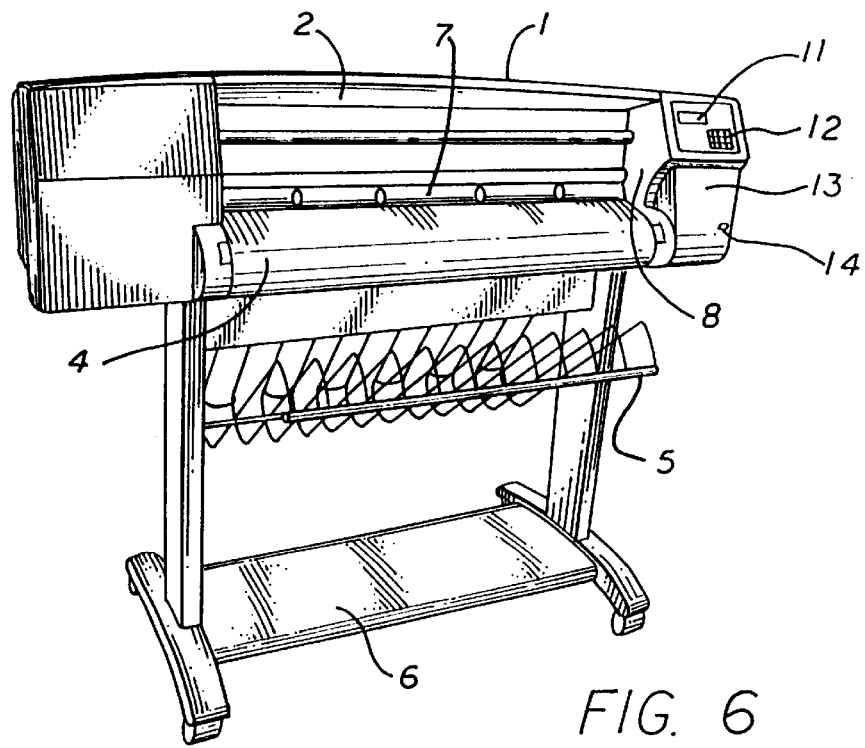
FIG. 6 is an isometric or perspective exterior view of a large-format printer-plotter which is a preferred embodiment of the present invention, and which can be used to implement the strategies of FIGS. 1 through 5.

The present invention is compatible equally well with the present generation of large-format printer/plotters and earlier basic designs, some of which remain in production. One such preferred printer/plotter includes a main case 1 (FIG. 6) with a window 2, and a left-hand pod 3 that encloses one end of the chassis. Within that pod are carriage-support and -drive mechanics and one end of the printing-medium advance mechanism, as well as a pen-refill station containing supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Within the case 1 and pods 3, 13 the carriage assembly 20 (FIG. 7) is driven in reciprocation by a motor 31—along dual support and guide rails 32, 34—through the intermediary of a drive belt 35. The motor 31 is under the control of signals 57 from a digital electronic microprocessor (essentially all of FIG. 11 except the print engine 50). In a block diagrammatic showing, the carriage assembly 20 travels to the right 55 and left (not shown) while discharging ink 54.

A very finely graduated encoder strip 33 is extended taut along the scanning path of the carriage assembly 20, and read by an automatic optoelectronic sensor 133, 233 to provide position and speed information 52 for the microprocessor. (In FIG. 11, signals in the print engine are flowing from left to right except the information 52 fed back from the encoder sensor 233—as indicated by the associated leftward arrow.)

The codestrip 33 thus enables formation of color inkdrops at ultrahigh resolution (typically 24 pixels/mm) and precision, during scanning of the carriage assembly 20 in each direction.

A currently preferred location for the encoder strip 33 is near the rear of the carriage tray (remote from the space into which a user's hands are inserted for servicing of the pen refill cartridges). Immediately behind the pens is another advantageous position for the strip 36 (FIG. 3). The encoder sensor 133 (for use with the encoder strip in its forward position 33) or 233 (for rearward position 36) is disposed with its optical beam passing through orifices or transparent portions of a scale formed in the strip.

Figure 8:
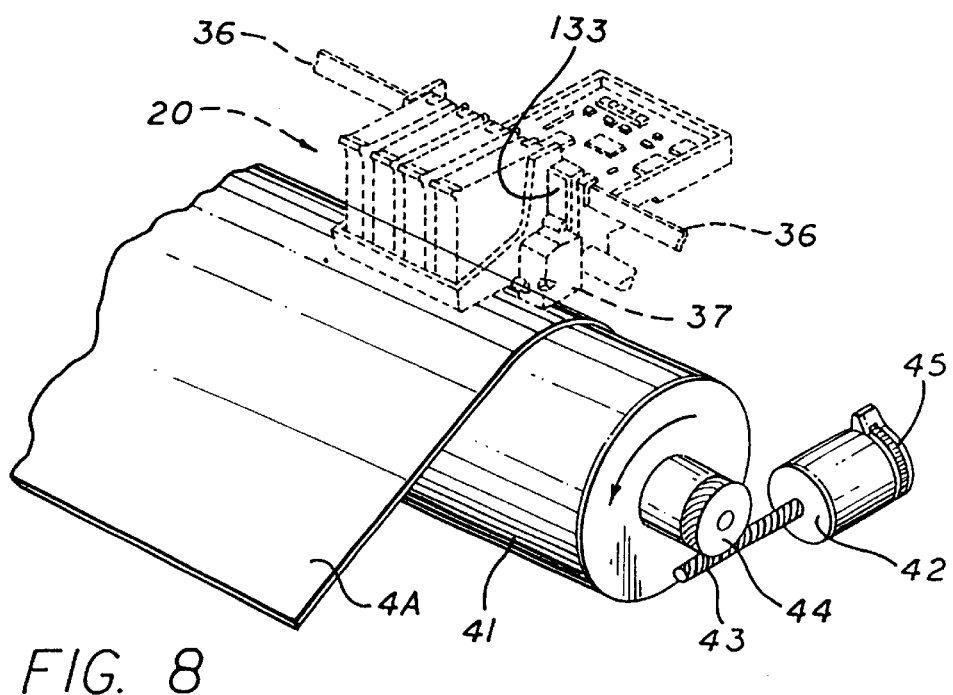
FIG. 8 is a like view of a printing-medium advance mechanism which is also mounted within the case or cover of the FIG. 6 device, in association with the carriage as indicated in the broken line in FIG. 8.

A cylindrical platen 41 (FIG. 8)—driven by a motor 42, worm 43 and worm gear 44 under control of signals 46 from the processor 15—rotates under the carriage-assembly 20 scan track to drive sheets or lengths of printing medium 4A in a medium-advance direction perpendicular to the scanning. Print medium 4A is thereby drawn out of the print-medium roll cover 4, passed under the pens on the carriage 20 to receive inkdrops 54 for formation of a desired image, and ejected into the print-medium bin 5.

Figure 9:
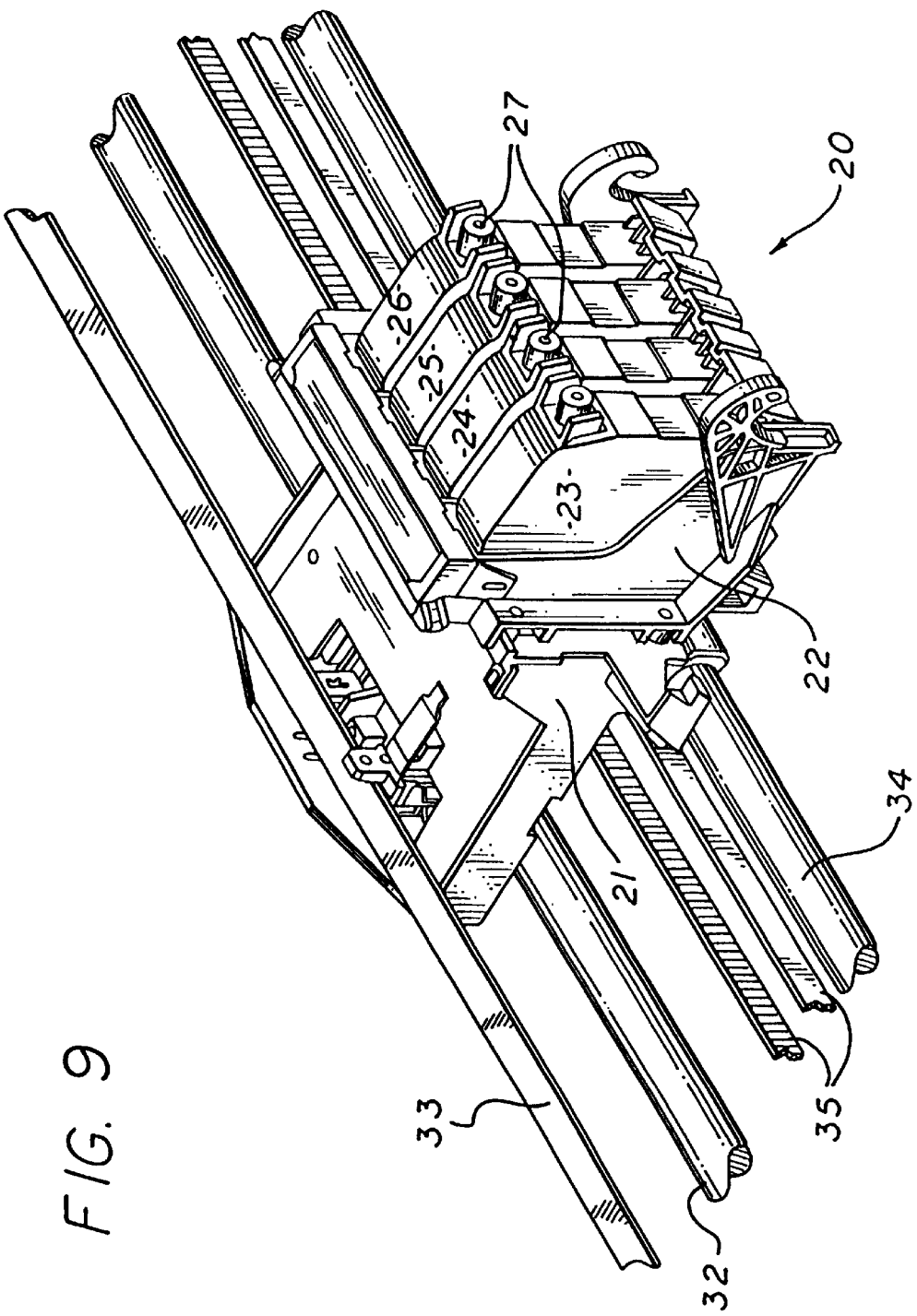
FIG. 9 is a like but more-detailed view of the FIG. 7 carriage, showing the printheads or pens which it carries.

The carriage assembly 20 includes a previously mentioned rear tray 21 (FIG. 9) carrying various electronics. It also includes bays 22 for preferably four pens 23–26 holding ink of four different colors respectively—preferably cyan in the leftmost pen 23, then magenta 24, yellow 25 and black 26.

Figure 10:
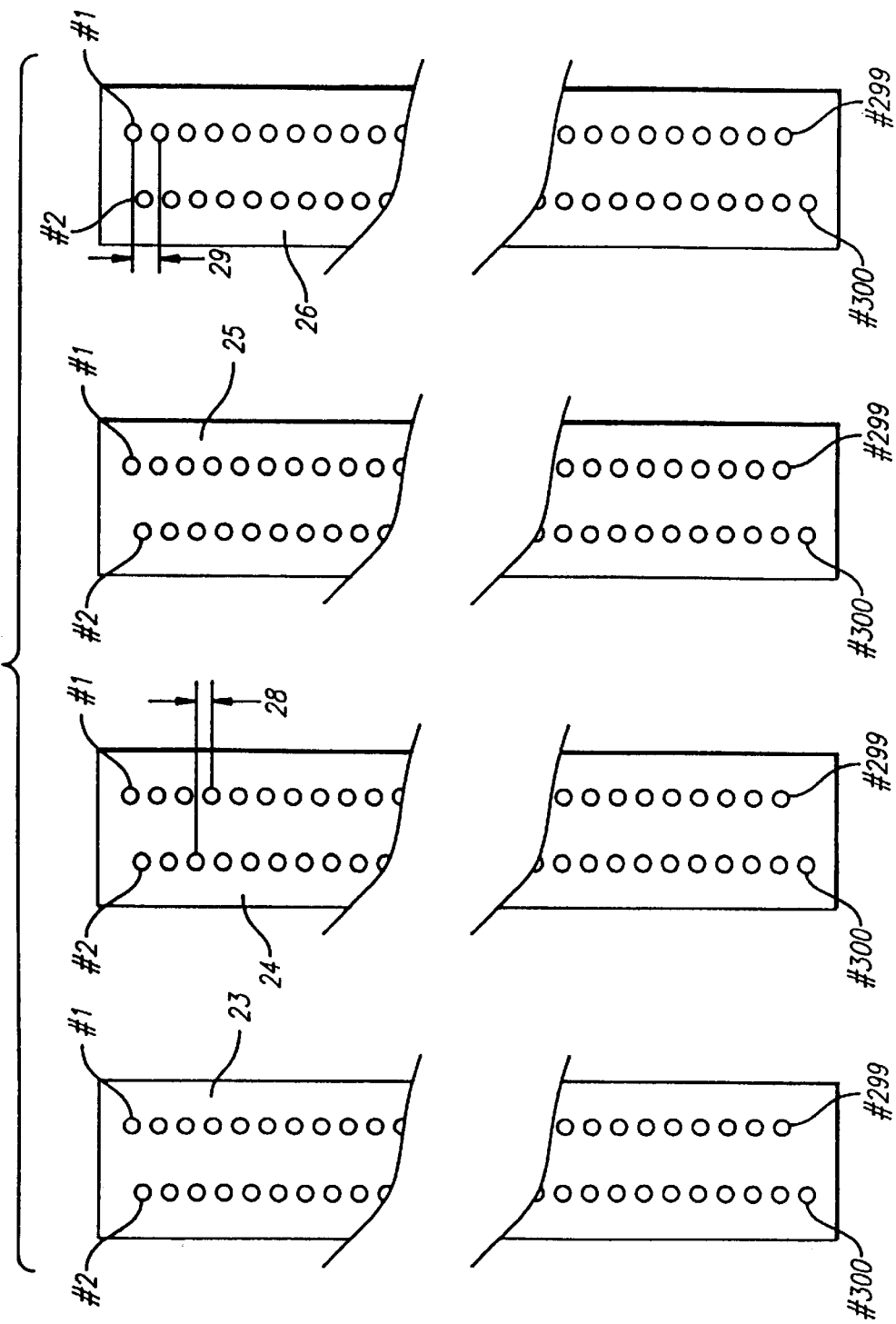
FIG. 10 is a bottom plan of the printheads or pens, showing their nozzle arrays.

Each of these pens, particularly in a large-format printer/plotter as shown, preferably includes a respective ink-refill valve 27. The pens, unlike those in earlier mixed-resolution printer systems, all are relatively long and all have nozzle spacing 29 (FIG. 10) equal to one-twelfth millimeter—along each of two parallel columns of nozzles. These two columns contain respectively the odd-numbered nozzles 1 to 299, and even-numbered nozzles 2 to 300.

The two columns, thus having a total of one hundred fifty nozzles each, are offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter, or 600 per inch.

Preferably black (or other monochrome) and color are treated identically as to speed and most other parameters. In the preferred embodiment the number of printhead nozzles used is always two hundred forty, out of the three hundred nozzles (FIG. 10) in the pens.

This arrangement allows for software/firmware adjustment of the effective firing height of the pen over a range of ±30 nozzles, at approximately 24 nozzles/mm, or ±30/24= ±1¼ mm. This adjustment is achieved without any mechanical motion of the pen along the print-medium advance direction.

Alignment of the pens can be automatically checked and corrected through use of the extra nozzles. As will be understood, the invention is amenable to use with a very great variety in the number of nozzles actually operated.

5. MICROPROCESSOR HARDWARE a. Basic processing apparatus—Data-processing arrangements for the present invention can take any of a great variety of forms. To begin with, image-processing and printing-control tasks 332, 40 can be shared (FIG. 11) among one or more processors in each of the printer 320 and an associated computer and/or raster image processor 30.

A raster image processor ("RIP") is nowadays often used to supplement or supplant the role of a computer or printer—or both—in the specialized and extremely processing-intensive work of preparing image data files for use, thereby releasing the printer and computer for other duties. Processors in a computer or RIP typically operate a program known as a "printer driver".

These several processors may or may not include general-purpose multitasking digital electronic microprocessors (usually found in the computer 30) which run software, or general-purpose dedicated processors (usually found in the printer 320) which run firmware, or application-specific integrated circuits (ASICs, also usually in the printer). As is well-understood nowadays, the specific distribution of the tasks of the present invention among all such devices, and still others not mentioned and perhaps not yet known, is primarily a matter of convenience and economics.

On the other hand, sharing is not required. If preferred the system may be designed and constructed for performance of all data processing in one or another of the FIG. 11 modules—in particular, for example, the printer 320.

Regardless of the distributive specifics, the overall system typically includes a memory 232$m$ for holding color-corrected image data. These data may be developed in the computer or raster image processor, for example with specific artistic input by an operator, or may be received from an external source.

Ordinarily the input data proceed from image memory 232$m$ to an image-processing stage 332 that includes some form of program memory 333—whether card memory or hard drive and RAM, or ROM or EPROM, or ASIC structures. The memory 333 provides instructions 334, 335 for automatic operation of rendition 336 and printmasking 338.

Image data cascades through these latter two stages 336, 338 in turn, resulting in new data 339 specifying the colorants to be deposited in each pixel, in each pass of the printhead carriage 20 over the printing medium 41. It remains for these data to be interpreted to form:

actual printhead-actuating signals 53 (for causing precisely timed and precisely energized ink ejection or other colorant deposition 54), actual carriage-drive signals 57 (for operating a carriage-drive motor 35 that produces properly timed motion 55 of the printhead carriage across the printing medium), and actual print-medium-advance signals 46 (for energizing a medium-advance motor 42 that similarly produces suitably timed motion of the print-medium platen 43 and thereby the medium 41).

Such interpretation is performed in the printing control module 40. In addition the printing control module 40 may typically be assigned the tasks of receiving and interpreting the encoder signal 52 fed back from the encoder sensor 233.

Figure 11:
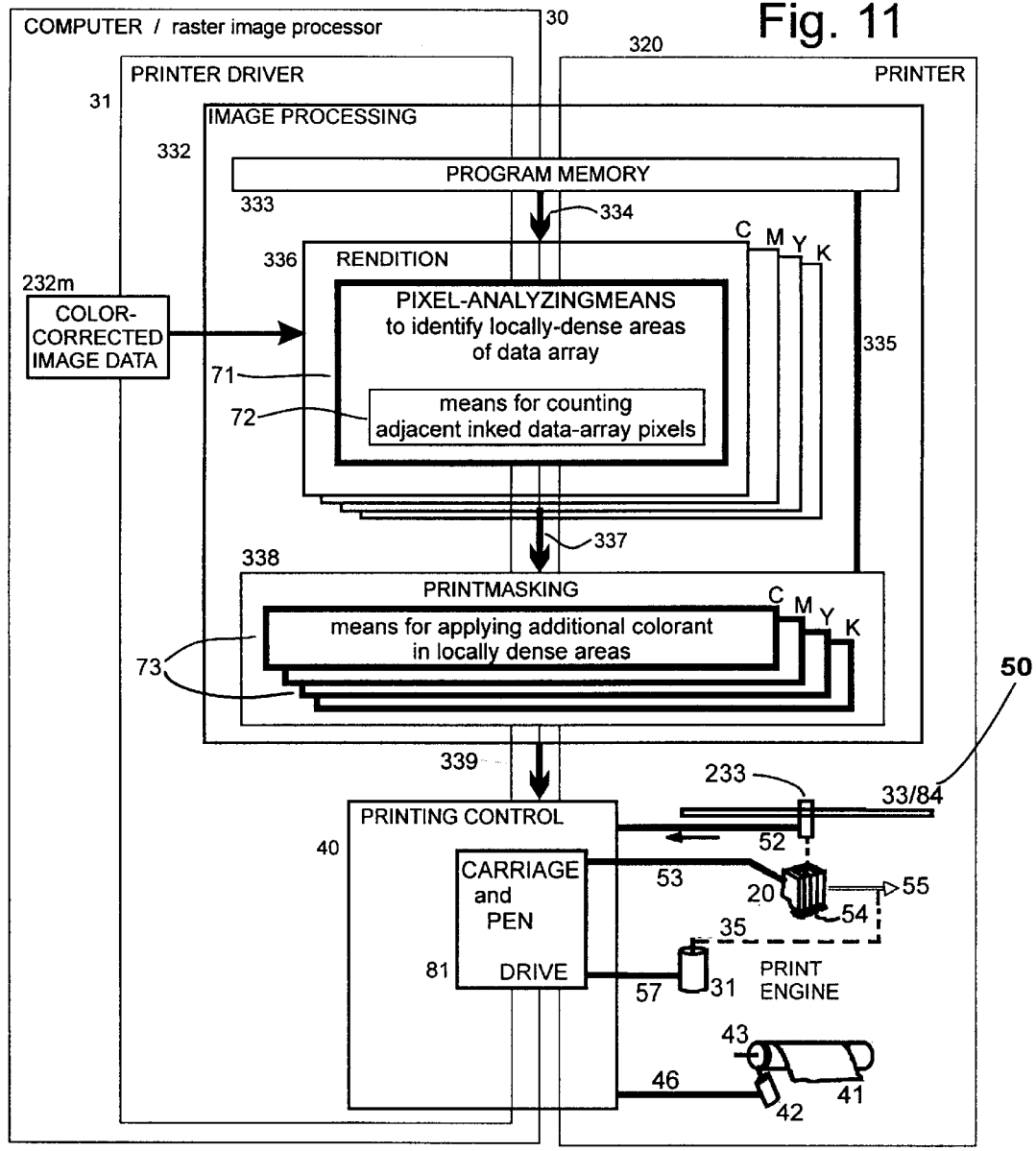
FIG. 11 is a highly schematic block diagram of the printer/plotter of FIGS. 6 through 10, particularly showing key signals flowing from and to one or more digital electronic microprocessors to effectuate printing.

The printing-control stage 40 necessarily contains electronics and program instructions for interpreting the colorant-per-pixel-per-pass information 339. Most of this electronics and programming is conventional, and represented in the drawing merely as a block 81 for driving the carriage and pen. That block in fact may be regarded as providing essentially all of the conventional operations of the printing control stage 40.

b. Subsystems for propletion—Also appearing in FIG. 11 are certain specific modules and associated data-flow paths 71–73 implementing the present invention. Certain of these illustrated specific functions represent one particular preferred embodiment—most closely corresponding to the method of FIG. 4 rather than FIG. 5.

In particular the rendition stage preferably is replicated for each of the several system colorants CMYK as shown, and also preferably includes pixel-analyzing means 71 for identifying locally-dense areas of the data array. These means, in the preferred embodiments discussed in this document, include some means 72—ideally including the candidate array (FIG. 3*a*)—for counting adjacent inked data-array pixels as detailed earlier.

The analyzing means 71 may be regarded as representative of various integrated-circuit stages (in addition to the pixel-analyzing means 71) devoted to performing the propletion functions discussed earlier. Outputs from the analyzing means 71 are used for depletion and propletion processing (not shown here) as discussed and illustrated earlier.

The rendition stage also includes various other elements (not shown) for performing all of the conventional rendition functions, such as dithering or error diffusion. Similarly the printmasking apparatus 338 serves as additional-colorant application means 73—also replicated for the several system colorants CMYK as shown—for completing the propletion functions.

Output signals 339 from the printmasking stage flow to the printing-control module 40. There machine-language control signals are generated, based respectively on the several colorant data planes CMYK, developed in the rendition and printmask stages 336, 338 to operate each of the printheads 54.

C. Efficient algorithmic circuitry for propletion and depletion—It has been mentioned above that processing is ideally performed in common for both conventional depletion and the innovative propletion of the present invention. When processing is performed in an ASIC, the physical structures of the ASIC are specified in such a way as to enable one common set of circuitry elements to do both these jobs.

For propletion, that is singularly easy to accomplish because the circuitry elements previously used in conventional systems to perform depletion are simply now used for both. In modern electronics, circuitry elements for an ASIC are not represented in schematics or other circuit diagrams as such, but rather in the form of Verilog HDL code, maintained in a computer for design purposes.

That selfsame code later is actually fed directly into devices that prepare masks for fabrication of the ASIC. Thus HDL code represents both schematic and tooling.

A short passage from the HDL code (FIG. 12) for implementing preferred embodiments of the present invention makes plain that there is no need to modify the ASIC circuit elements previously used for depletion. As the illustration shows, no explicit change in the specifications was needed to adapt the pixel-counting process for propletion.

The above disclosure is intended as merely exemplary, and not to limit the scope of the invention—which is to be determined by reference to the appended claims.

What is claimed is:

1. A saturation-enhancing method of printing an image, by construction from individual marks formed in a pixel array on a printing medium, based on pixels of a corresponding input data array; said method comprising the steps of:

applying all data for a particular colorant, in the input data array, one time to control deposition of the particular colorant in forming the pixel array on the printing medium; and applying all data for said same particular colorant, in said data array, at least another time to control deposition of an additional positive quantity of said same particular colorant in forming said pixel array on the printing medium; and wherein at least one of the applying steps comprises the substep of selecting particular pixels of the data array to control deposition of said same particular colorant.

2. The method of claim 1 particularly for use in a scanning printer, and wherein:

the pixel-array forming one time comprises depositing colorant in one pass of the scanning printer; and the pixel-array forming another time comprises depositing colorant in another, different pass of the scanning printer.

3. The method of claim 1, particularly for use in a scanning printer having a scanning printhead that makes plural passes across the printing medium, and wherein:

the pixel-array forming one time and the pixel-array forming another time both direct colorant-deposition control data to a printmasking stage; and the printmasking stage allocates colorant deposition in particular pixels among the plural passes.

4. The method of claim 3, wherein:

the selecting substep comprises defining a maximum density for the pixel array of the printing medium.

5. The method of claim 4, wherein:

the selecting substep further comprises identifying locations of the particular pixels to receive said maximum density.

6. The method of claim 5, wherein:

said identifying comprises analyzing pixels of the data array to find locally dense areas.

7. The method of claim 6, wherein:

said analyzing comprises counting neighboring pixels of at least some pixels in the data array.

8. The method of claim 3, wherein:

the selecting substep comprises defining locations of the particular pixels to receive a particular colorant density for said particular colorant.

9. The method of claim 8, wherein:

the selecting substep further comprises generation of additional density levels for printing based upon density levels within the data array; and said generation comprises defining locations of specific pixels among the particular pixels, to receive at least one other specified colorant density for said same particular colorant.

10. The method of claim 9, further comprising:

performing both applying steps with respect to at least one other particular colorant.

11. A method of printing an image, by construction from individual colorant marks deposited in a pixel array on a printing medium, based on pixels of a corresponding original data array; said method comprising the steps of:

based on the original array, defining an augmentation array; and applying the augmentation array to control a portion of deposition of colorant in forming said pixel array on the printing medium.

12. The method of claim 11, further comprising the step of:

also applying the original array to control another portion of deposition of colorant in forming said pixel array on the printing medium;

wherein the augmentation-array applying step increases the deposition of colorant, relative to the original-array applying step, by less than a one hundred percent increase.

13. The method of claim 11, wherein:

the applying step uses the augmentation array to provide a nonlinear colorant-deposition response to the data array.

14. The method of claim 13, wherein:

the nonlinear colorant-deposition response tends to compensate for a nonlinear response of said image construction to the data array.

15. The method of claim 13, particularly for use with a printing mechanism that passes a printhead plural times over a printing medium; and wherein:

the applying step comprises using the augmentation array to control operation of at least one pass of the printhead.

16. The method of claim 13, particularly for use with a printing mechanism that has plural printheads for a particular ink color and dilution; and wherein:

the applying step uses the augmentation array to control operation of at least one printhead.

17. The method of claim 13, particularly for use with a printing mechanism that has plural sets of nozzles for a particular ink color and dilution; and wherein:

the applying step uses the augmentation array to control operation of at least one set of nozzles.

18. Apparatus for printing an image on a printing medium, by construction from individual marks formed in a pixel array on a printing medium, based on pixels of a corresponding data array; said apparatus comprising:

means for analyzing pixels of the data array to identify areas of the data array that are locally dense; and means for applying the identified locally dense areas of the data array to enhance printing of the image on the printing medium by adding colorant.

19. The apparatus of claim 18, wherein:

the analyzing means comprise means for counting inked data-array pixels adjacent to at least some of the data-array pixels; and the applying means comprise means for applying additional colorant to identified locally dense areas.

20. The apparatus of claim 18, further comprising:

printhead devices for applying colorant to such printing medium;

a carriage for moving the printhead devices in a scan direction across the printing medium;

printing-medium advance means for providing relative motion between the carriage and printing medium in an advance direction perpendicular to the scan direction;

an encoder system for developing signals related to position and velocity of the carriage relative to the printing medium in the scan direction; and wherein the analyzing means and applying means comprise a processor.

21. The apparatus of claim 20, wherein:

the analyzing means and the applying means each comprise means for operating with respect to each available particular colorant.

* * * * *